(12) United States Patent
Nakagawa

(10) Patent No.: US 12,447,795 B2
(45) Date of Patent: Oct. 21, 2025

(54) IN-VEHICLE-MOUNTED STRUCTURE

(71) Applicant: Nissan Motor Co., Ltd., Yokohama (JP)

(72) Inventor: Kenichi Nakagawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 89 days.

(21) Appl. No.: 18/575,480

(22) PCT Filed: Jul. 6, 2021

(86) PCT No.: PCT/JP2021/025507
§ 371 (c)(1),
(2) Date: Dec. 29, 2023

(87) PCT Pub. No.: WO2023/281633
PCT Pub. Date: Jan. 12, 2023

(65) Prior Publication Data
US 2024/0300287 A1    Sep. 12, 2024

(51) Int. Cl.
*B60H 1/00* (2006.01)
(52) U.S. Cl.
CPC ............... *B60H 1/00571* (2013.01)
(58) Field of Classification Search
CPC .... B60H 1/00571; B60K 11/02; B60K 6/547; B60K 1/00; B60K 2001/001; B60K 6/405; B60K 6/46; F16H 57/0443; B60Y 2200/92; B60L 7/14; Y02T 10/62
See application file for complete search history.

(56) References Cited

U.S. PATENT DOCUMENTS

| | | | |
|---|---|---|---|
| 9,266,423 B2 * | 2/2016 | Hoshinoya | B60K 6/48 |
| 2016/0248302 A1 * | 8/2016 | Nagao | H02K 5/225 |
| 2018/0038473 A1 * | 2/2018 | Dickson | F16H 57/0475 |
| 2019/0092158 A1 * | 3/2019 | Vettorazzo Neto | B60K 13/04 |

FOREIGN PATENT DOCUMENTS

JP    2009-269547 A    11/2009

* cited by examiner

*Primary Examiner* — Lionel Nouketcha
(74) *Attorney, Agent, or Firm* — GLOBAL IP COUNSELORS, LLP

(57) ABSTRACT

An in-vehicle-mounted structure in which a drive unit is mounted on a vehicle equipped with an engine. The drive unit includes a drive motor and a transmission. The drive motor and the transmission are connected in series in a width direction of the vehicle. An exhaust pipe of the engine is extended to pass adjacent the transmission in the longitudinal direction of the vehicle. The transmission includes a coolant flow channel through which flows coolant for cooling lubricating oil that lubricates a speed change mechanism inside the transmission. The coolant flow channel is positioned to face the exhaust pipe.

7 Claims, 5 Drawing Sheets

IN-VEHICLE-MOUNTED STRUCTURE

CROSS-REFERENCE TO RELATED APPLICATIONS

This application is a U.S. national stage application of International Application No. PCT/JP2021/025507, filed on Jul. 6, 2021.

BACKGROUND

Technical Field

The present invention relates to an in-vehicle-mounted structure for mounting a drive unit in a vehicle equipped with an engine.

Background Information

In a hybrid vehicle equipped with an engine and a rotating electrical machine (motor), because of the vehicle layout, the exhaust pipe through which the engine exhaust gases pass may be positioned adjacent to the motor. In such an arrangement, the heat of the high-temperature exhaust pipe is transferred to the motor, which raises motor temperature and reduces motor efficiency. For example, JP2009-269547A discloses a structure in which an insulator is provided between a motor and an exhaust pipe, and air is blown between the motor and the exhaust pipe from a blower, which prevents hot air from remaining near the motor.

SUMMARY

In the patent document described above, additional components, such as insulators and a blower, are installed in the vehicle to cool the motor, which increases the parts cost and the assembly man-hours.

In light of these problems, the object of the present invention is to provide an in-vehicle-mounted structure for mounting a drive unit in a vehicle such that, without increasing costs, heat from the exhaust pipe is not transferred to the motor.

An embodiment of the present invention is applied to an in-vehicle-mounted structure of a drive unit including a drive motor and a transmission in a vehicle equipped with an engine. The drive unit includes the drive motor and transmission connected in series in the width direction of the vehicle. An exhaust pipe of the engine is extended to pass adjacent to the transmission in the longitudinal direction of the vehicle. The transmission is equipped with a coolant flow channel, through which flows coolant for cooling lubricating oil that lubricates the speed change mechanism in the transmission, and which is positioned opposite the exhaust pipe.

By means of the present invention, since the transmission is interposed between the drive motor and the exhaust pipe, and a coolant flow channel is provided in a position of the transmission opposite the exhaust pipe, the direct transfer of heat from the exhaust pipe to the motor is suppressed. Thus, an increase in the temperature of the drive motor can be suppressed without reducing drive motor efficiency or the addition of new components such as a blower.

BRIEF DESCRIPTION OF THE DRAWINGS

Referring now to the attached drawings which form a part of this original disclosure.

DETAILED DESCRIPTION OF EMBODIMENTS

Embodiments of the present invention will be described below with reference to the drawings, etc.

Figure 1:
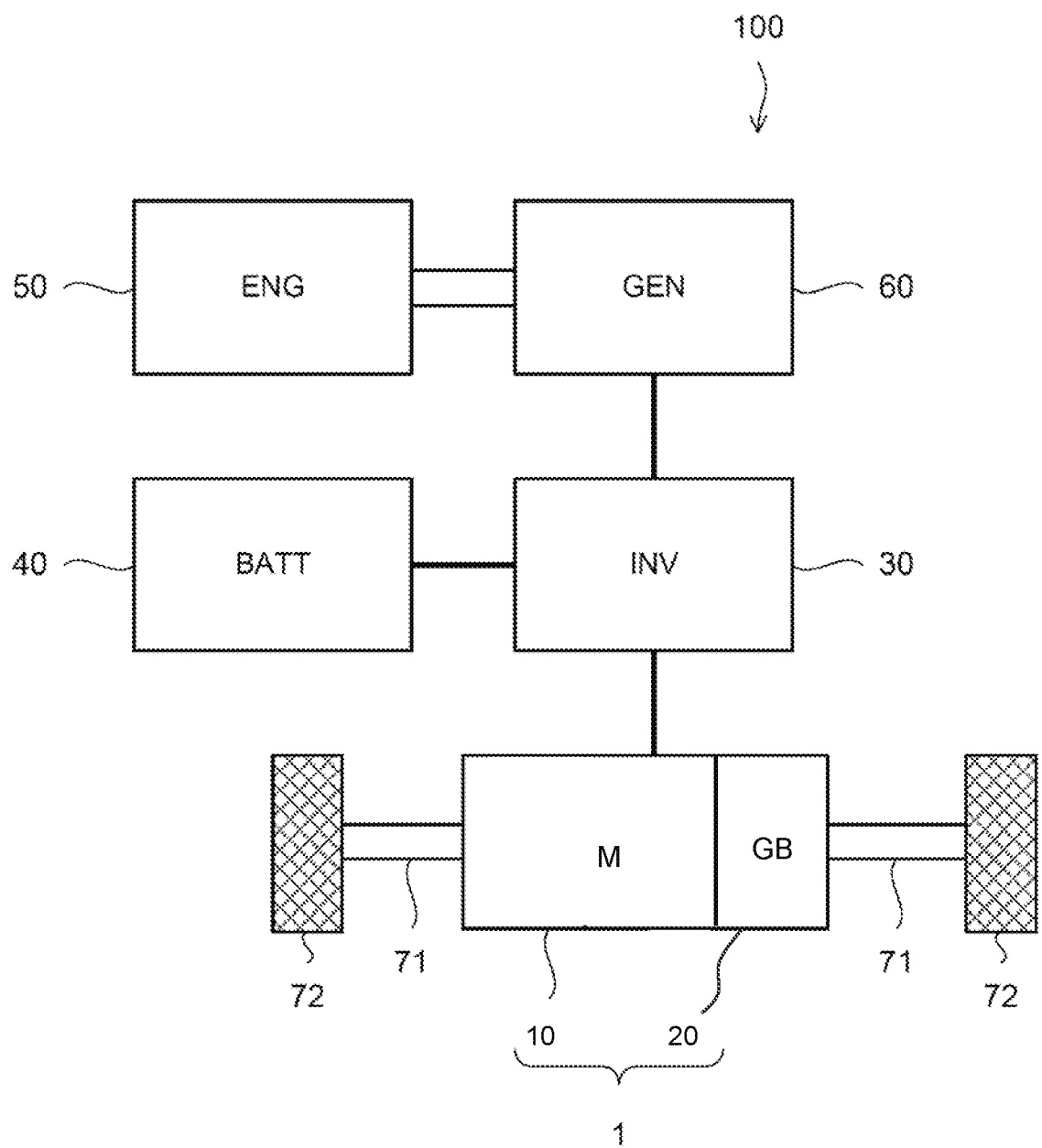
FIG. 1 is a block diagram of a hybrid vehicle equipped with an in-vehicle-mounted structure of a drive unit according to an embodiment of the present invention.

FIG. 1 shows a block diagram of a hybrid vehicle 100 equipped with a drive unit 1 according to an embodiment of the present invention.

The hybrid vehicle (hereinafter also referred to as the "vehicle") 100 is equipped with the drive unit 1, a battery 40, an engine 50, a generator 60, axles 71 and a pair of drive wheels 72. The drive unit 1 is equipped with a drive motor (rotating electric machine) 10, a gearbox (transmission) 20 and a power converter 30.

The drive motor 10 is driven by receiving the electric power supply from the power converter 30 and drives the vehicle 100 by rotating the drive wheels 72. The drive motor 10 also functions as a generator that generates regenerative power during the deceleration of the vehicle 100.

The gearbox 20 is a transmission device having a plurality of gears that reduces the speed of the rotation of the drive motor 10 and causes the drive wheels 72 to rotate via the axles 71. The gearbox 20 is arranged in series with the drive motor 10 and rotates the axles 71 through the gearbox 20 and the drive motor 10.

The power converter 30 is configured with an inverter unit, converts the electric power stored in the battery 40 into electric power suitable for driving the drive motor 10, and supplies the electric power to the drive motor 10. The power converter 30 receives the electric power generated by the generator 60 or the regenerated power of the drive motor 10 and charges the battery 40.

When the SOC of the battery 40 decreases, the power converter 30 starts the engine 50, and the engine 50 drives the generator 60 to generate power. The electric power generated by the generator 60 is supplied to the drive motor 10 via the power converter 30 or is used to charge the battery 40.

The vehicle 100 of the present embodiment is equipped with the drive unit 1 on the rear side of the vehicle 100 to drive the drive wheels 72, which are the rear wheels. A separate motor that drives the front wheels may be provided on the front side of the vehicle 100 (for example, in the engine compartment), or the engine 50 can be configured to drive the front wheels.

Figure 2:
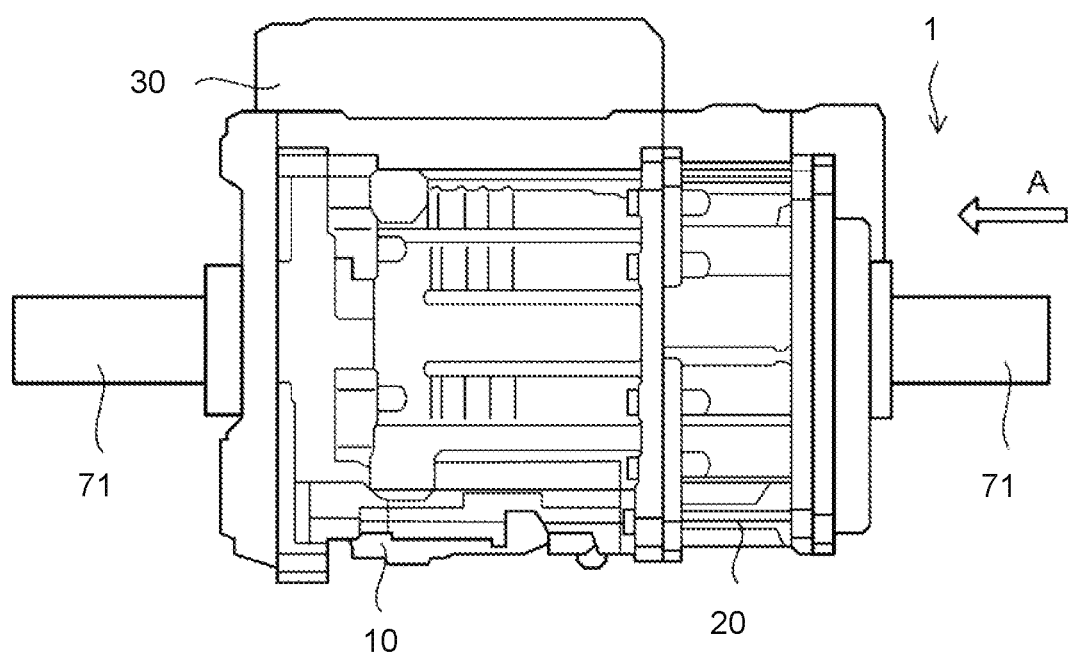
FIG. 2 is an explanatory diagram of the drive unit.
Figure 3:
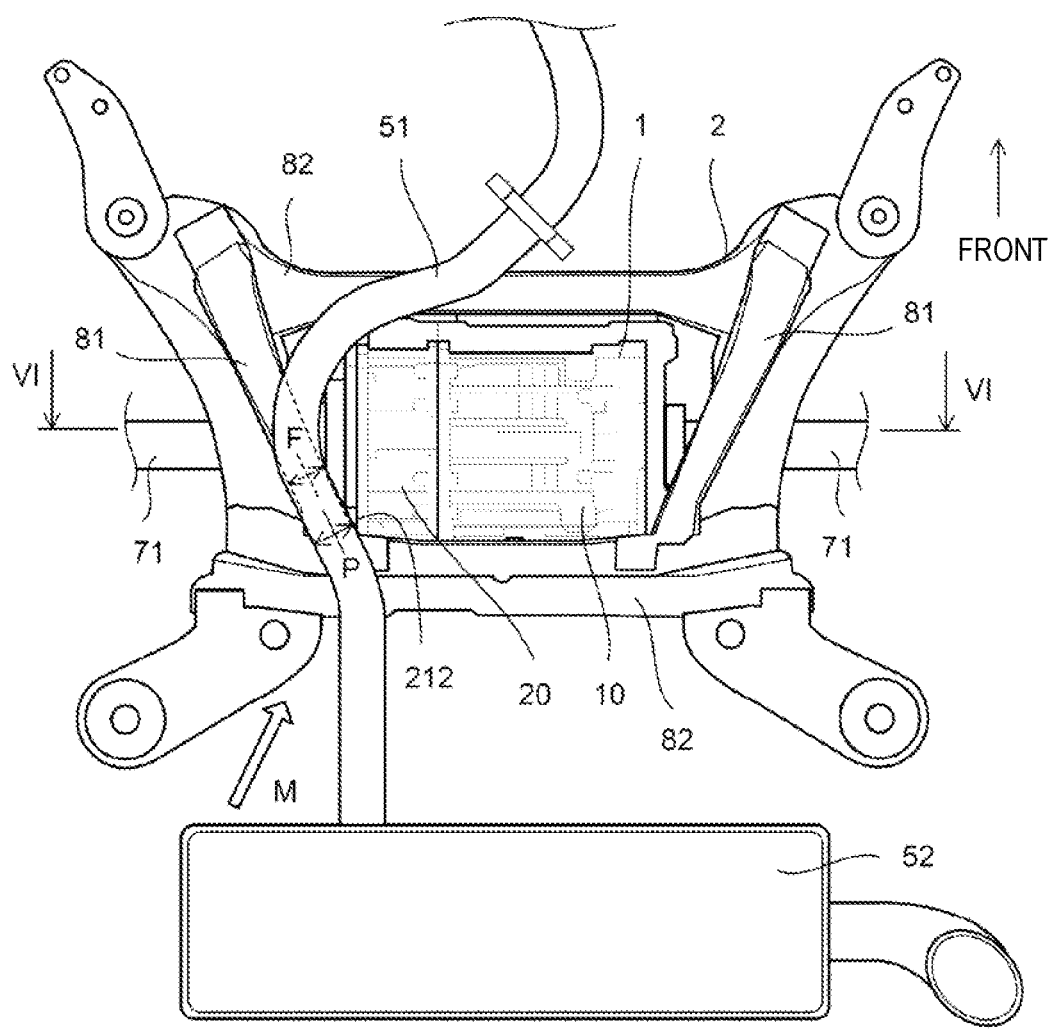
FIG. 3 is an explanatory diagram of the in-vehicle-mounted structure for mounting the drive unit in a vehicle.

FIG. 2 shows an explanatory diagram of the drive unit 1. FIG. 3 shows an explanatory diagram of the structure for mounting the drive unit 1 in the vehicle according to an embodiment of the present invention in a view in which the drive unit 1 and a suspension member 2 are seen from the underside of the vehicle 100.

As shown in FIG. 2, the drive unit 1 is configured such that the drive motor 10 and the gearbox 20 are connected in the width direction of the vehicle 100. In FIG. 2, the drive motor 10 is located on the left side, the gearbox 20 is located on the right side, and the power converter 30 is arranged above the drive motor 10. The axles 71 extend outwardly in the width direction of the vehicle 100 from both ends of the drive motor 10 and the gearbox 20.

The drive shaft of the drive motor 10 has a hollow structure, and one end of the drive shaft is connected to the input side of a speed reduction mechanism (speed change mechanism) 22 (see FIG. 6) of the gearbox 20. The rotation which has been reduced by the speed reduction mechanism 22 is transmitted to the drive wheels 72 by the axle 71, which is connected to the output side of the speed reduction mechanism 22, passes through the hollow shaft to either side of the drive motor 10 and the gearbox 20.

As shown in FIG. 3, the drive unit 1 is supported by the suspension member 2 and mounted on the vehicle 100.

The suspension member 2 includes a set of side members 81 that extend in the longitudinal direction of the vehicle 100 and a set of cross members 82 that extend in the widthwise direction of the vehicle 100. The set of side members 81 and the set of cross members 82 define an approximately rectangular form. The drive unit 1 is fixed to the side members 81 and the cross members 82 via a mount, such as bushings, so that the drive unit is located inside the rectangular shape of the suspension member 2.

An exhaust pipe 51 extends from the engine 50. The exhaust pipe 51 extends form the engine 50 to a muffler 52 located on the rear side of the vehicle 100 and is positioned on the lower side of the vehicle 100.

Close to the suspension member 2, the exhaust pipe 51 is arranged to pass below the suspension member 2 (near side in FIG. 3) along the longitudinal direction of the vehicle 100.

Here, in the prior art, when the drive unit 1 was arranged in the rear section of the vehicle 100, there were the following problems.

The exhaust pipe 51 has a high surface temperature (e.g., 20 0° C.) due to the high temperature of the exhaust gas discharged from the engine 50 that passes therethrough. On the other hand, the drive motor 10 and the power converter 30 should be located away from the exhaust pipe 51 since exposure to such high temperatures decreases efficiency.

However, in the rear area of the vehicle 100, where the suspension member 2 is located, in addition to the drive unit 1, there are arranged the suspension member 2, the muffler 52, suspension elements, etc., not shown. Therefore, the placement of the exhaust pipe 51 at the rear of the vehicle 100 may be restricted, so that the distance between the drive unit 1 and the exhaust pipe 51 may prove insufficient.

In this case, components such as insulators or blowers may be provided to prevent heat from the exhaust pipe 51 from being transmitted to the drive motor 10. However, use of such a configuration would increase and assembly man-hours, resulting in higher costs.

Thus, as described below, the present embodiment is configured so that, without increasing the parts count, heat from the exhaust pipe 51 is not transmitted to the drive motor 10.

As shown in FIG. 3, the exhaust pipe 51 extends from the engine 50 to the rear of the vehicle 100, and curves towards the left in FIG. 3 (towards the side of the gearbox 20 side of the drive unit 1) near the suspension member 2. The exhaust pipe 51 curves toward the rear of the vehicle 100 near the intersection of the front cross member 82 and the right side member 81, and is arranged to follow the right side member 81, passing immediately below the right side member 81. The exhaust pipe 51 then passes the rear cross member 82.

In this way, the exhaust pipe 51 extends below and runs along the front cross member 82 and the right side member 81 of the suspension member 2 adjacent to the lower part of the suspension member 2.

Figure 4:
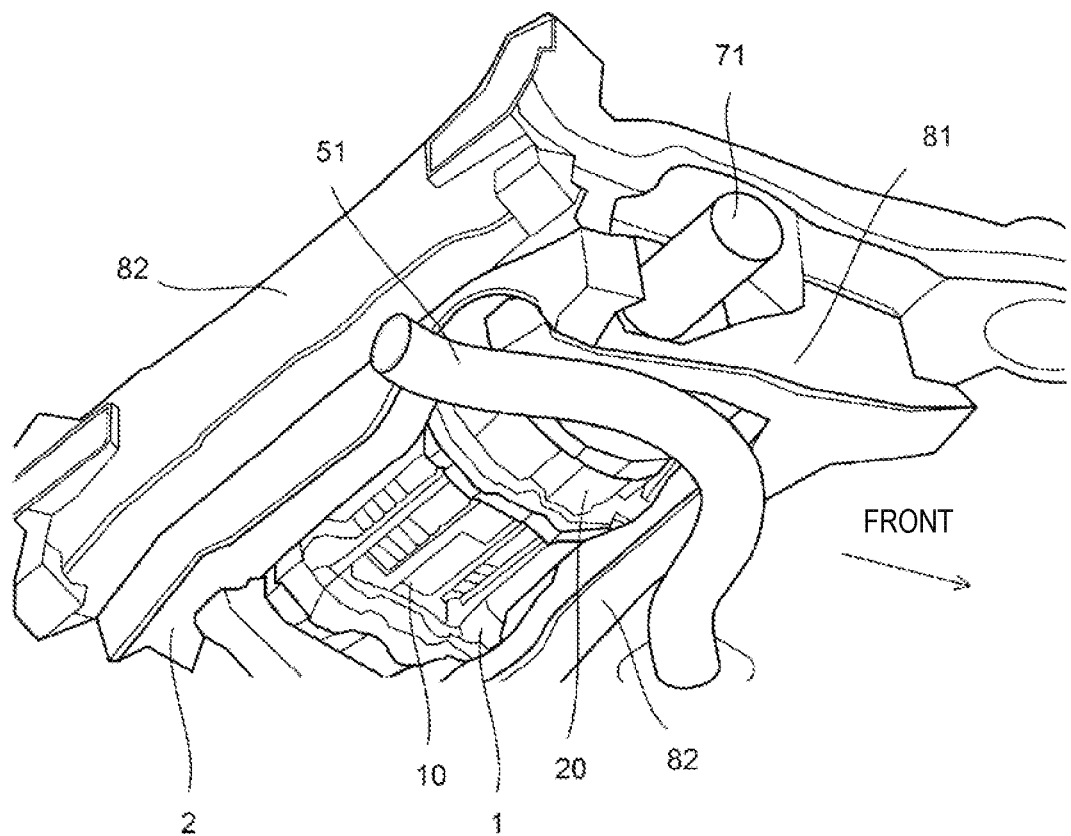
FIG. 4 is an explanatory diagram of the in-vehicle-mounted structure for mounting the drive unit in the vehicle.

FIG. 4 shows an explanatory diagram of the drive unit 1 and the suspension member 2 as seen obliquely from the rear side of the vehicle 100 in the direction of arrow M of FIG. 3.

As shown in FIG. 4, the exhaust pipe 51 is configured to extend along the side member 81 and the cross member 82 beneath the suspension member 2. This arrangement of the exhaust pipe 51 near the suspension member 2 results in the side member 81 being interposed between the exhaust pipe 51 and the gearbox 20 in the vicinity of the drive unit 1.

The suspension member 2 is made from a metal with high heat capacity, such as iron. Thus, the heat transferred from the exhaust pipe 51 to the suspension member 2 is diffused to the various parts of the suspension member 2 and is quickly dissipated by the travel wind.

With this configuration, heat from the exhaust pipe 51 is shielded by the side member 81 and is less likely to be transferred to the drive unit 1 side.

In the drive unit 1, the drive motor 10 is located farther from the exhaust pipe 51 (left side of FIG. 4) than the gearbox 20. That is, as seen from the drive motor 10, the gearbox 20 and the side member 81 are between the drive motor and the exhaust pipe 51.

With this configuration, the heat from the exhaust pipe 51 is shielded by the side members 81 and the gearbox 20 and is prevented from being directly transferred to the drive motor 10 and the power converter 30.

Further, the gearbox 20 includes a coolant flow channel 211, as will now be explained.

Figure 5:
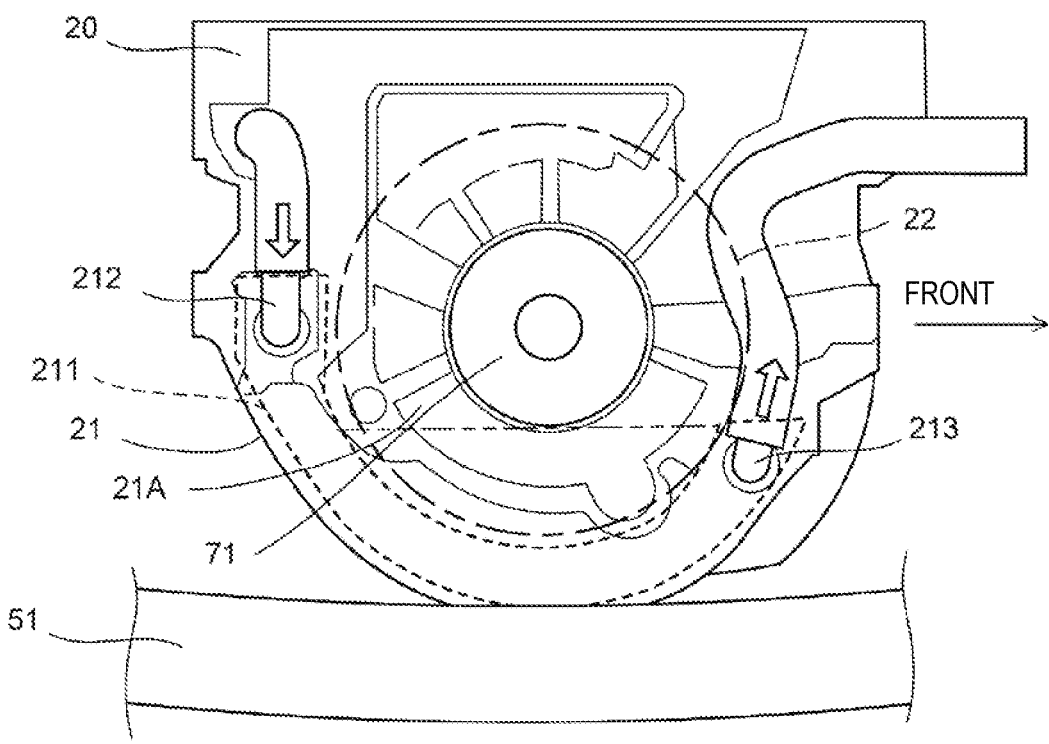
FIG. 5 is a side elevational view of a gearbox.
Figure 6:
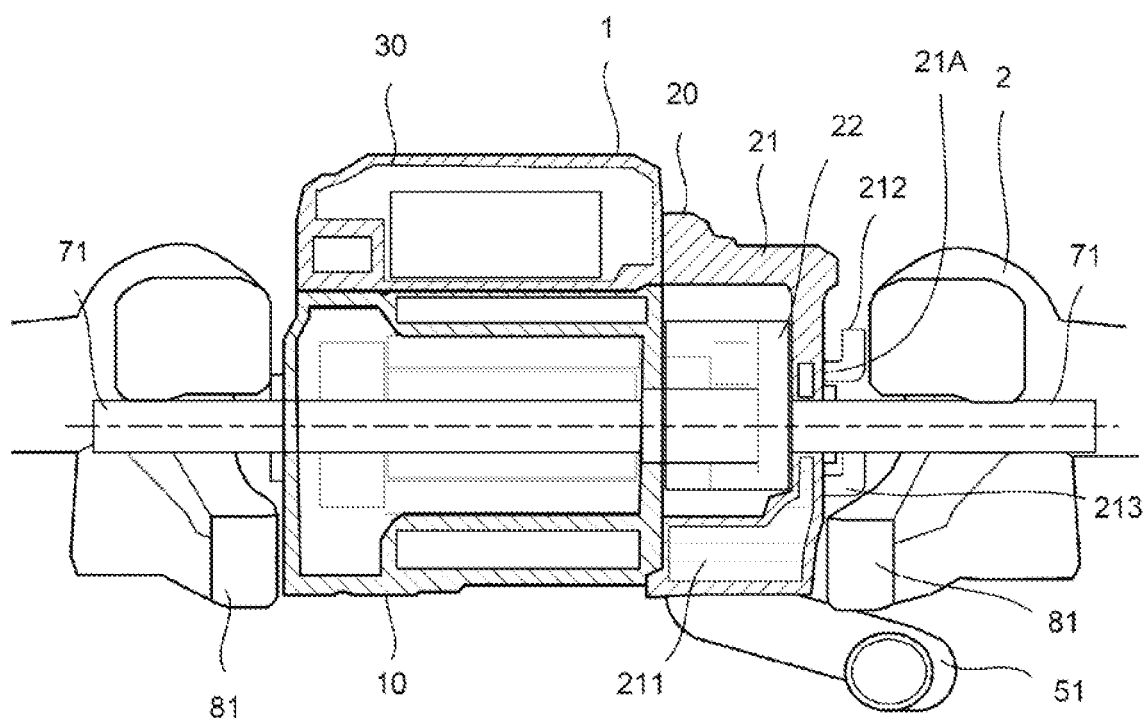
FIG. 6 is a cross-sectional diagram of the drive unit.

FIG. 5 shows an explanatory diagram of the gearbox 20 as seen from the axial direction (in the direction of arrow A of FIG. 2). FIG. 6 shows a cross section of the drive unit 1 and the suspension member 2 through VI-VI in FIG. 3.

The gearbox 20 comprises a speed reduction mechanism 22 (see FIG. 6) consisting of a plurality of gears (for example, a planetary gear mechanism) in a housing 21 that has an essentially cylindrical outer diameter.

The housing 21 is formed in a cylindrical shape from a metal, such as an aluminum alloy, and has the coolant flow channel 211 (indicated by the dotted line in FIG. 5) through which a refrigerant (coolant) flows. If the housing 21 is cut along a plane perpendicular to the direction of the axis of rotation, the coolant flow channel 211 forms an arcuate space, opposite the lower part of the speed reduction mechanism 22, in the lower portion of the housing 21. This arcuate space forms a passage that extends in the longitudinal direction of the vehicle and is configured to cover the lower side of the speed reduction mechanism 22 (indicated by the single-dotted chain line in FIG. 5) housed in the housing 21.

A coolant inlet 212 and a coolant outlet 213 for allowing coolant to flow through the coolant flow channel 211 are provided on an end surface 21A (axial end on the opposite side of the drive motor 10) of the housing 21. The coolant inlet 212 and the coolant outlet 213 are arranged on the end surface 21A of the gearbox 20 at separate locations in the longitudinal direction of the vehicle 100.

That is, the coolant inlet 212 is disposed on the vehicle 100 rearward side of the gearbox 20 and is connected to one end of the arcuate coolant flow channel 211. The coolant outlet 213 is disposed on the vehicle 100 frontward side of the gearbox 20 and is connected to the other, upper end of the arcuate coolant flow channel 211. The coolant inlet 212 is positioned at a greater height from the road surface than the coolant outlet 213.

Lubricating oil for lubricating the speed reduction mechanism 22 is stored inside the housing 21. The lubricating oil comes in contact with the coolant flow channel 211 formed in the housing 21 via the inner surface of the housing 21 and is cooled by the coolant in the coolant flow channel 211.

As shown in FIG. 6, the coolant flow channel 211 of the gearbox 20 is formed at a position facing the exhaust pipe 51, which is disposed near the bottom of the gearbox 20.

Although some of the heat from the exhaust pipe 51 passes through the side member 81 and is transferred to the lower portion of the end surface 21A side of the housing 21 of the gearbox 20, the heat transferred to the housing 21 is suppressed from being transferred to the drive motor 10 and the power converter 30 due to the presence of the coolant flow channel 211 in the housing 21.

In the present embodiment, there are locations between the exhaust pipe 51 and the gearbox 20 where the suspension member 2 (side members 81, cross member 82) does not necessarily exist. Even in such locations, the interposition of the coolant flow channel 211 of the gearbox 20 prevents the transfer of heat from the exhaust pipe 51 to the drive motor 10.

Also, in the gearbox 20, the coolant inlet 212 is positioned at a greater height from the road surface than the coolant outlet 213. The coolant flow channel 211, which is arcuate at the bottom of the housing 21, is configured to cover the lubricating oil stored in the gearbox 20 from below.

With this configuration, the cooling efficiency of the gearbox 20 on uphill roads can be increased. More specifically, when the vehicle 100 is on an uphill road, the surface of the lubricating oil inside the gearbox 20 (indicated by the single-dotted chain line in FIG. 5) is tilted in accordance with the inclination of the uphill road, so that the oil level at the rear side of the vehicle is higher than that at the front side of the vehicle. Further, when the vehicle 100 travels over uphill roads, the torque required by the drive motor 10 or the engine 50 increases relative to travel on flat or downhill roads. Therefore, in such cases, the temperature of the exhaust pipe 51 increases.

As shown in FIG. 5, since the rear side of the vehicle of the coolant flow channel 211 (coolant inlet 212) is in a higher position, even if the oil level of the lubricating oil is tilted rearward, the coolant inlet 212 is positioned above the tilted lubricating oil level. Thus, almost all of the stored lubricating oil is cooled by the coolant.

Therefore, even when the vehicle 100 travels over an uphill road, the cooling efficiency of the gearbox 20 is not impaired. Further, since the coolant of the coolant flow channel 211 quickly dissipates the heat transferred from the exhaust pipe 51, the heat from the exhaust pipe 51 is not transferred to the drive motor 10.

Further, as shown in FIG. 3, the exhaust pipe 51 in the vicinity of the coolant inlet 212 located in the housing 21 of the gearbox 20 is configured such that, in a plan view, its center (center line P) is coincident with the widthwise center of the side member 81 (center line F) or outside (away from the gearbox 20) of the widthwise center.

The heat from the exhaust pipe 51 is shielded by the side member 81 and is less likely to be transferred to the gearbox 20, especially to the coolant inlet 212. The coolant flowing in from the coolant inlet 212 is at a lower temperature than the coolant flowing out from the cooling water outlet 213 since it has not yet been subjected to heat exchange inside the gearbox 20. Thus, by means of a configuration in which there is no heat transfer from the exhaust pipe 51 near the coolant inlet 212, the cooling efficiency of the gearbox 20 can be prevented from being impaired.

The embodiment of the present invention described above is applied to a structure for mounting the drive unit 1 comprising the drive motor 10 and the transmission (gearbox 20) in the vehicle 100 equipped with the engine 50. The drive unit 1 consists of the drive motor 10 and the gearbox 20 connected in series in the width direction of the vehicle 100. The exhaust pipe 51 of the engine 50 is extended so as to pass near the gearbox 20 in the longitudinal direction of the vehicle 100. The gearbox 20 is equipped with the coolant flow channel 211, through which flows the coolant for cooling the lubricating oil that lubricates the speed reduction mechanism 22 in the gearbox 20, and which is positioned opposite the exhaust pipe 51.

With this configuration, the heat from the exhaust pipe 51 is not directly transferred to the drive motor 10, and the heat that is transferred to the gearbox 20 is quickly removed by the coolant. As a result, since the drive motor 10 is unaffected by the heat from the exhaust pipe 51, it is possible to prevent a reduction in the efficiency of the drive motor 10 without the addition of new parts, such as heat shields. The drive motor 10 and the power converter 30 also have housings, each of which is equipped with a coolant flow channel through which coolant flows.

In addition, in the present embodiment, the gearbox 20 has the housing 21 that houses the speed reduction mechanism 22, the coolant flow channel 211 is formed in the housing 21, and the coolant flow channel 211 is formed below the housing 21 in an arcuate shape along the longitudinal direction of the vehicle.

With this configuration, the cooling efficiency of the gearbox 20 is not impaired since the lubricating oil is continuously cooled by the coolant on the inner circumferential side of the arcuate coolant flow channel 211.

Moreover, in the present embodiment, the coolant inlet 212 and the coolant outlet 213 of the coolant flow channel 211 are arranged in the housing 21 separated by a distance in the longitudinal direction of the vehicle 100, and one of the coolant inlet 212 and the coolant outlet 213 is positioned at a greater height from the ground than the other inlet or outlet.

With this configuration, even if the oil level of the lubricating oil tilts inside the gearbox 20 when the vehicle 100 travels over an uphill road, the cooling efficiency of the gearbox 20 is not impaired since the coolant flows above the tilted lubricating oil level.

Also, in the present embodiment, the coolant inlet 212 is located farther rearward of the vehicle 100 than the coolant outlet 213, and the coolant inlet 212 is located at a greater height from the ground than the coolant outlet 213.

With this configuration, when the vehicle 100 travels over an uphill road, even if the oil level of the lubricating oil tilts rearward inside the gearbox 20, the coolant circulates due to the presence of the coolant inlet 212 above the tilted lubricating oil surface, so that, even during travel on uphill roads, the cooling efficiency of the gearbox 20 is not impaired.

Further, in the present embodiment, in the drive unit 1, the power converter 30 that supplies electric power to the drive motor 10 is arranged above the drive motor 10.

With this configuration, the heat from the exhaust pipe 51 is not directly transferred to the power converter 30, and the power converter 30 is unaffected by the heat from the exhaust pipe 51, so that it is possible to prevent a reduction in the efficiency of the power converter 30 without the need for additional components.

In the present embodiment, the drive unit 1 is supported by the suspension member 2. The suspension member 2 comprises the set of side members 81 that extend in the longitudinal direction of the vehicle 100 and the set of cross members 82 that extend in the widthwise direction of the vehicle 100, and the drive unit 1 is disposed within the approximately rectangular form defined by the set of side members 81 and the set of cross members 82. The exhaust pipe 51 is disposed along a side member 81 and below this side member 81.

With this configuration, the heat from the exhaust pipe 51 is shielded by the side members 81 and is less likely to be transferred to the drive unit 1 side; thus, a reduction in the efficiency of the drive motor 10 can be prevented without the need for additional parts.

Further, in the present embodiment, the exhaust pipe 51 is located near the coolant inlet 212 of the gearbox 20, on the lower side of the side member 81 and outside the center of the side member 81 in the width direction of the vehicle 100.

With this configuration, the cooling efficiency of the gearbox 20 is not impaired since the heat from the exhaust pipe 51 is shielded by the side member 81 at the coolant inlet 212 from which the coolant with the lowest temperature flows into the gearbox 20.

Embodiments of the present invention and modified examples thereof were described above, but the above-described embodiments and modified examples illustrate only some of the application examples of the present invention and are not intended to limit the technical scope of the present invention to the specific configurations of the above-described embodiments.

The drive motor 10 of the present embodiment may be used as a source of drive power mounted in devices other than automobiles, such various electrical or industrial machines.

Further, in the present embodiment, the coolant inlet 212 is disposed on the vehicle 100 rearward side of the gearbox 20, but no limitation is implied thereby; the coolant outlet 213 may be arranged on the rearward side of the vehicle 100, and the coolant may be configured to flow from the vehicle front side of the gearbox 20 toward the rear side of the vehicle.

Further, in the present embodiment, the gearbox 20 may be configured as a transmission that has a speed change mechanism capable of switching between a plurality of reduction gears.

Further, in the present embodiment, the suspension member 2 (side member 81) is interposed between the exhaust pipe 51 and the gearbox 20, but no limitation is implied thereby. It is sufficient if only the gearbox 20 is interposed between the power converter 30 and the exhaust pipe 51 and the drive motor 10, without the suspension member 2. The coolant flow channel 211 of the gearbox 20 prevents the transfer of heat from the exhaust pipe 51 to the drive motor 10 and the power converter 30. In this case, the exhaust pipe 51 may be disposed in the vicinity of the side of the housing 21 with the coolant flow channel 211, rather than below the gearbox 20.

The invention claimed is:

1. An in-vehicle mounted structure, the in-vehicle mounted structure comprising:
   a drive unit including a drive motor and a transmission to be mounted to a vehicle equipped with an engine, the drive motor and the transmission being connected in series in a widthwise direction of the vehicle; and
   an exhaust pipe of the engine extending adjacent to the transmission in a longitudinal direction of the vehicle, the transmission including a coolant flow channel through which flows coolant for cooling lubricating oil that lubricates a speed change mechanism inside the transmission, and the coolant flow channel being positioned to face the exhaust pipe, the coolant flow channel not being in fluid communication with the exhaust pipe, the speed change mechanism including a plurality of gears.

2. The in-vehicle mounted structure according to claim 1, wherein
   the transmission includes a housing that houses the speed change mechanism,
   the coolant flow channel is formed in the housing, and
   the coolant flow channel is formed below the housing in an arcuate shape to face a lower portion of the speed change mechanism.

3. The in-vehicle mounted structure according to claim 2, wherein
   a coolant inlet and a coolant outlet of the coolant flow channel are arranged in the housing separated by a distance in the longitudinal direction of the vehicle, and
   one of the coolant inlet and the coolant outlet is positioned at a greater height from a road surface than an other one of the coolant inlet and the coolant outlet.

4. The in-vehicle mounted structure according to claim 3, wherein
   the coolant inlet is arranged farther rearward of the vehicle than the coolant outlet, and
   the coolant inlet is arranged at a greater height from the road surface than the coolant outlet.

5. The in-vehicle mounted structure according to claim 1, wherein
   the drive unit includes a power converter that supplies electric power to the drive motor, and that is disposed above the drive motor.

6. The in-vehicle mounted structure according to claim 1, wherein
   the drive unit is supported by a suspension member,
   the suspension member includes a set of side members extending in the longitudinal direction of the vehicle and a set of cross members extending in the widthwise direction of the vehicle,
   the drive unit is disposed within an area defined by the set of side members and the set of cross members, and
   the exhaust pipe is disposed along and below the side member.

7. The in-vehicle mounted structure according to claim 6, wherein
   the exhaust pipe is disposed near the coolant inlet of the transmission, below the side members, and farther outside from a center of the side members in the widthwise direction of the vehicle.

* * * * *